Nov. 15, 1966    H. M. SHAW    3,285,135
ELECTRIC DRILL ATTACHMENT FOR ROUTING
Filed Aug. 26, 1965    2 Sheets-Sheet 1

INVENTOR.
Harold M. Shaw
BY
B. B. Olive
ATTORNEY

Nov. 15, 1966     H. M. SHAW     3,285,135
ELECTRIC DRILL ATTACHMENT FOR ROUTING

Filed Aug. 26, 1965     2 Sheets-Sheet 2

INVENTOR.
Harold M. Shaw
BY
*B. B. Olive*
ATTORNEY

United States Patent Office 3,285,135
Patented Nov. 15, 1966

3,285,135
ELECTRIC DRILL ATTACHMENT FOR ROUTING
Harold M. Shaw, 205 Mozart Ave., Winston-Salem, N.C.
Filed Aug. 26, 1965, Ser. No. 482,668
3 Claims. (Cl. 90—12)

This invention relates to an electric drill attachment for routing and, more specifically, to an electric drill attachment which is adaptable to aid in the removal of a caulking seam.

In the remodeling, repair and maintenance of buildings, particularly around doors, windows and joints, caulking which has been placed between two adjoining flat or right-angled wall sections must be removed and replaced. Caulking, over a period of time, becomes very brittle and hard to remove from isolated places; also, the wall sections adjacent the caulking may be easily damaged by a slip of a chipping tool, drill or the like which may be used in the removal of the caulking. Heretofore, the most practical way to remove caulking has been to use a ninety degree two flute cutter in combination with a standard electric drill, the drill when energized being adapted to grind and powder the caulking. It can easily be seen that the drill may remove portions of the wall as well as the caulking if the user is not careful. Attachments have been devised which limit the depth of the drilling; however, these attachments do not permit the removal of caulking from crevices, corners and the like with any degree of accuracy. Therefore, an object of this invention is to provide an attachment for a drill which permits a drill bit to act as a router to remove caulking from corners, crevices, flat surfaces and the like.

Another object of this invention is to provide an electric drill with a guage for routing and which limits the depth of cut.

A further object of this invention is to provide an electric drill with an adjustable depth guage attachment for routing and which permits an exchange of drill bits without having to remove the attachment therefrom.

A still further object of the present invention is to provide an electric drill with a depth gauge routing attachment which can be mounted on any standard portable hand drill.

Other objects and advantages of this invention will become apparent when the following detailed description is read in conjunction with the appended drawings, specification and claims. Preferred embodiments of this invention will now be described with reference to the accompanying drawings, in which:

Figure 1:
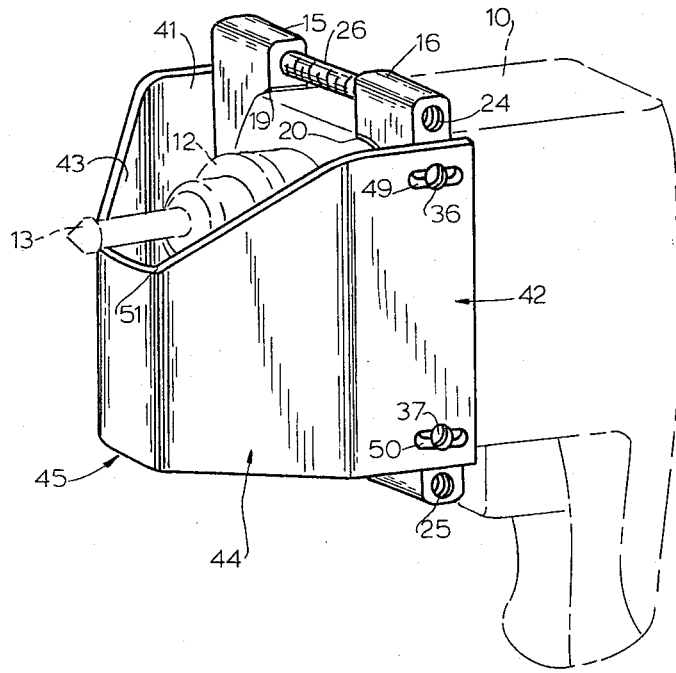
FIGURE 1 is a perspective view of a hand drill showing the depth gauge attachment mounted thereon.

One embodiment of the present invention contemplates attaching a guiding means and depth guage to a portable hand drill for controlling the angle and depth of cut by a bit and for routing groove lines in flat surfaces and at the intersection of perpendicular surfaces. The guiding shield and depth gauge is substantially U-shaped in design having parallel leg portions and a vertex portion which is comprised of two surfaces which extend and slope inwardly from the respective leg portions and a front surface which is substantially perpendicularly arranged with the leg portions and which connects the inwardly sloping surfaces. With reference to the front plate, the sloping surfaces extend outwardly from the ends of the front plate making angles of 135° therewith. The U-shaped drill depth gauge forms an elongated trough which adapts the same to be easily slid along both a flat surface and a cornered surface. A portion of the drill depth gauge or guide shield beginning with the junctions between the parallel legs and the inwardly sloping vertex sections and extending downwardly to the front section is cut away to provide an access for removing the drill bit without having to remove the guide shield from the hand drill. The guide shield is attached to the portable hand drill by having the upper extremities of the leg portions of the U securely mounted on a pair of oppositely disposed U-shaped brackets. The inner surfaces of the brackets are lined with rubber which acts to firmly secure the brackets on the drill. To mount the brackets on the drill, one bracket is provided with a pair of holes for slidably receiving a bolt while the other bracket is provided with a pair of threaded holes for threadably engaging the bolt which extends through the first mentioned bracket. Thus, the guide shield is sturdily mounted on the drill by tightening the bolts which join the brackets.

The invention is illustrated in connection with the accompanying drawings in which the figures are illustrative of the preferred embodiment of the invention.

In the drawings, a portable, electric hand drill 10 has a universal chuck 12 rotatably mounted thereon which is adapted to receive a variety of sizes of ninety degree two flute cutters 13 or other bits suitable to routing. Cutters 13 are adapted to grind various sizes of caulking beads which range in width from ¼ inch to ½ inch. Electric drill 10 is provided with a pair of clamps 15 and 16. Clamps 15 and 16 have inwardly curving surfaces 17 and 18, respectively, which are adapted to conform to a portion of the periphery of portable drill housing 10. Surfaces 17 and 18 in turn have securely mounted thereon rubber strips 19 and 20, respectively, which conform to contours of surfaces 17 and 18 and which prevent clamps 15 and 16 from scarring or damaging the surface of drill 10. Strips 19 and 20 also provide a spring locking effect in that when clamps 15 and 16 are tightly locked around the housing of drill 10, the resiliency of the rubber continuously exerts an expanding force between drill 10 and clamps 15 and 16.

Clamp 15 is provided with a pair of passageways 22 and 23 which are aligned with a pair of threaded holes 24 and 25 in clamp 16. A pair of threaded bolts 26 and 27 are provided respectively for passageway 22 and threaded hole 24 and passageway 21 and threaded hole 23 whereby when each bolt is slidably received by its respective passageway in clamp 15 and threadably received by its respective threaded hole in clamp 16 clamps 15 and 16 are adapted to be tightened on drill 10. When clamps 15 and 16 are mounted on drill 10 as shown in FIGURE 1 and when threaded bolts 26 and 27 are tightened in threaded holes 24 and 25, clamps 15 and 16 become adapted to being rigidly received and held on drill 10. Clamp 15 is provided with threaded holes 30 and 31 and clamp 16 is provided with threaded holes 32 and 33 and collectively they are adapted to receive screws 34, 35 36 and 37, respectively.

Figure 2:
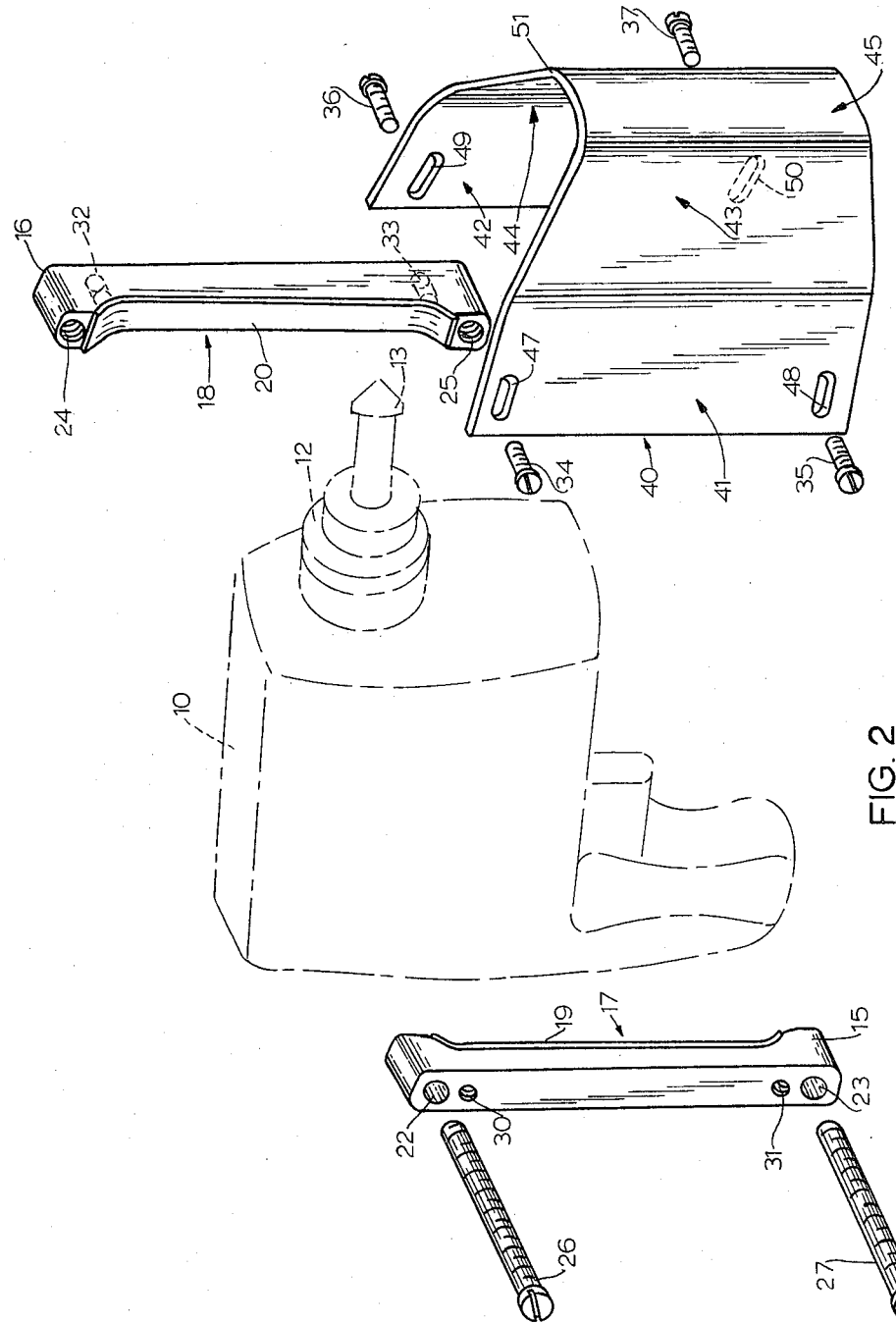
FIGURE 2 is an exploded pictorial view showing the various elements which comprise this invention.

Guiding shield 40 which is U-shaped in design is comprised of a pair of parallel surface legs 41 and 42, a pair of inwardly sloping flat sections 43 and 44 which are extensions of legs 41 and 42, respectively, and a front flat plate 45 which joins flat sections 43 and 44. Front plate 45 and inwardly sloping flat sections 43 and 44 form the vertex of the U. Leg surface 41 is provided with elongated slots 47 and 48 and leg surface 42 is provided with elongated slots 49 and 50, slots 47, 48, 49 and 50 respectively receiving screws 34, 35, 36 and 37 thereby adapting said guiding shield 40 to be slidably mounted on clamps 15 and 16. As shown in FIGURES 1 and 2, the top edge 51 of member 40 slopes downwardly and effectively forms an opening in front plate 45 for receiving bit 13 and providing easy access to chuck 12. Front flat plate 45 is positioned in a plane perpendicular to the axis of cutting bit 13 and at a predetermined distance behind the tip thereof to control the depth of cut. Cutting bit 13 extends beyond front plate 45 and is free to rotate in opening formed by top edge 51.

Figure 4:
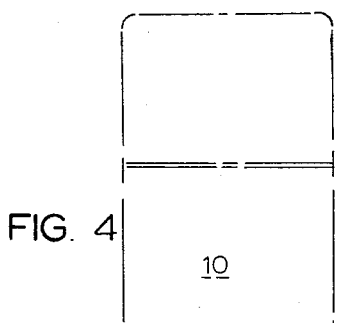
FIGURE 4 is a cut-away view of the drill and attachment showing the drill bit engaging the caulking in a flat surface.
Figure 3:
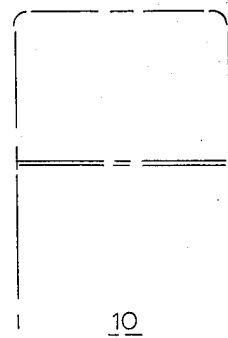
FIGURE 3 is a cut-away view of the drill and attachment showing the drill bit engaging the caulking in a corner.

In operation, after guide shield 40 has been mounted on clamps 15 and 16 which securely engage drill 10, the proper ninety degree two flute cutter 13 is selected and inserted in chuck 12. The depth of cut is determined by adjusting front plate 45 of guide shield 40 relative to cutter 13. A corner as shown in FIGURE 4 having a caulking bead receives a guide shield 40 and cutter 13 whereby upon the energization of drill 10, cutter 13 removes the caulking along a selected path. It can be seen that guide shield 40 both limits the depth at which the cutter penetrates the caulking and also establishes a track along which cutter 13 may follow thereby grinding a selected and substantially straight groove. The guide shield 40 is also adapted to remove caulking from a flat surface as shown in FIGURE 4 by limiting the depth at which the cutter penetrates the caulking. In both cases the operator is given firm operating tool surfaces which can be placed against the surfaces being routed.

Many different embodiments of this invention may be made without departing from the scope and spirit thereof. Therefore, it is to be understood that the invention is not to be limited to the specific embodiment shown and described herein, except as defined in the appended claims.

I claim:

1. In combination with a portable hand drill having a housing, a chuck and a cutting drill mounted in said chuck, a detachable gauge for controlling the angle and depth of cut by said bit and adapting said drill to serve as a routing device for routing groove lines in flat surfaces and at the intersection of perpendicular surfaces, said gauge comprising:
   (A) a rigid integral sheet member bent to comprise,
      (1) a front flat plate section positioned in a plane perpendicular to the axis of said bit and at a predetermined distance behind the tip, said bit extending beyond and being free to rotate in said front plate section and said distance controlling the depth of cut of said bit,
      (2) a pair of oppositely disposed side flat plate sections each extending rearwardly from parallel edges of said front plate and each forming angles of 135 degrees therewith such that the projected planes of said side sections intersect in front of said front section and form an angle of 90 degrees, and
   (B) mounting means detachably secured to said housing and connected to support said sheet member thereby enabling said gauge to be detachably mounted on said hand drill.

2. In combination of claim 1 wherein said front plate section includes an opening extending inwardly from from one edge thereof and said bit resides in said opening.

3. In the combination of claim 1 wherein said sheet member is adjustably mounted on said mounting means thereby enabling said distance and depth of cut to be regulated while said gauge remains installed on said hand drill.

No references cited.

WILLIAM W. DYER, Jr., *Primary Examiner.*

GERALD A. DOST, *Assistant Examiner.*